United States Patent
Tiedemann, Jr.

(10) Patent No.: US 6,654,611 B2
(45) Date of Patent: Nov. 25, 2003

(54) METHOD AND APPARATUS FOR PERFORMING IDLE HANDOFF IN A MULTIPLE ACCESS COMMUNICATION SYSTEM

(75) Inventor: Edward G. Tiedemann, Jr., San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/570,219

(22) Filed: May 12, 2000

(65) Prior Publication Data

US 2002/0142776 A1 Oct. 3, 2002

Related U.S. Application Data

(62) Division of application No. 09/453,611, filed on Dec. 3, 1999, which is a continuation of application No. 08/660,436, filed on Jun. 7, 1996, now Pat. No. 6,021,122.

(51) Int. Cl.[7] .................................................. H04Q 7/20
(52) U.S. Cl. ................... 455/450; 455/437; 370/329; 370/332; 370/335
(58) Field of Search ................................ 455/436, 437, 455/438, 439, 442, 450, 453, 455; 370/331, 332, 335, 329

(56) References Cited

U.S. PATENT DOCUMENTS

| | | | |
|---|---|---|---|
| 4,004,224 A | 1/1977 | Arens et al. ................ 325/2 |
| 4,112,257 A | 9/1978 | Frost ....................... 179/2 EB |
| 4,123,718 A | 10/1978 | Lampert et al. ............ 325/474 |
| 4,222,115 A | 9/1980 | Cooper ....................... 375/1 |
| 4,309,771 A | 1/1982 | Wilkens ..................... 375/58 |
| 4,475,010 A | 10/1984 | Huensch et al. |
| 4,495,648 A | 1/1985 | Giger ......................... 455/73 |
| 4,580,262 A | 4/1986 | Naylor et al. ................. 371/5 |
| 4,641,322 A | 2/1987 | Hasegawa ..................... 375/1 |
| 4,672,658 A | 6/1987 | Kavehrad et al. ............. 379/63 |
| 4,718,081 A | 1/1988 | Brenig ....................... 379/60 |
| 4,765,753 A | 8/1988 | Schmidt ...................... 379/60 |
| 4,811,421 A | 3/1989 | Havel et al. ................. 455/69 |
| 4,881,271 A | * 11/1989 | Yamauchi et al. .......... 455/436 |
| 5,054,110 A | 10/1991 | Comroe et al. .............. 455/33 |
| 5,056,109 A | 10/1991 | Gilhousen et al. ............. 375/1 |
| 5,101,501 A | 3/1992 | Gilhousen et al. ............ 455/33 |
| 5,103,459 A | 4/1992 | Gilhousen et al. ............. 375/1 |
| 5,109,390 A | 4/1992 | Gilhousen et al. ............. 375/1 |
| 5,109,528 A | 4/1992 | Uddenfeldt et al. .......... 455/33 |
| 5,127,100 A | 6/1992 | D'Amico ................... 455/33.1 |
| 5,164,958 A | 11/1992 | Omura ........................ 375/1 |
| 5,179,571 A | 1/1993 | Schilling ..................... 375/1 |

(List continued on next page.)

FOREIGN PATENT DOCUMENTS

| | | | |
|---|---|---|---|
| EP | 0430106 | 6/1991 | ............ H04Q/7/04 |

OTHER PUBLICATIONS

"Analysis of a CDMA Soft Handoff Algorithm", Zhang et al., IEEE, 1995 pp. 819–823.

TIA/EIA/IS–95 Interim Standards, TIA, p. 147–148, Jul. 1993.

*Primary Examiner*—Quochien Vuong
(74) *Attorney, Agent, or Firm*—Philip Wadsworth; Kent Baker; Pavel Kalousek

(57) ABSTRACT

A method and apparatus which permits handoffs while the mobile station is in the system access state. This is achieved by providing for channel assignment messages to be sent over the paging channel of a plurality of base stations, which increases the probability of one of the messages getting through. In addition, this assures the mobile station will be able handoff to a different base station and have a traffic channel allocated to it on the new base station without delay. In addition, a method and apparatus which permits the mobile station to be directly assigned into a soft handoff state upon traffic channel assignment.

28 Claims, 3 Drawing Sheets

U.S. PATENT DOCUMENTS

| | | |
|---|---|---|
| 5,267,261 A | 11/1993 | Blakeney, II et al. ............ 375/1 |
| 5,309,474 A | 5/1994 | Gilhousen et al. .............. 375/1 |
| 5,327,577 A | 7/1994 | Uddenfeldt ................ 455/33.2 |
| 5,345,467 A | 9/1994 | Lomp et al. ............... 370/33.2 |
| 5,491,718 A * | 2/1996 | Gould et al. ................. 370/335 |
| 5,491,837 A * | 2/1996 | Haartsen ..................... 455/437 |
| 5,590,177 A | 12/1996 | Vilmur et al. ............. 370/33.2 |
| 5,594,718 A | 1/1997 | Weaver et al. ............. 370/33.2 |
| 5,778,075 A * | 7/1998 | Haartsen ...................... 455/436 |
| 5,812,543 A * | 9/1998 | Sugita ......................... 370/335 |
| 5,828,662 A * | 10/1998 | Jalali et al. ................. 370/335 |
| 5,926,469 A * | 7/1999 | Norstedt et al. ............ 455/439 |
| 6,081,714 A * | 6/2000 | Wakizaka ................... 455/437 |

* cited by examiner

METHOD AND APPARATUS FOR PERFORMING IDLE HANDOFF IN A MULTIPLE ACCESS COMMUNICATION SYSTEM

This application is a divisional application of co-pending application Ser. No. 09/453,611 filed Dec. 3, 1999 entitled "METHOD AND APPARATUS FOR PERFORMING IDLE HANDOFF IN A MULTIPLE COMMUNICATION SYSTEM" which is a continuation of application serial No. 08/660,436, filed Jun. 7, 1996, now U.S. Pat. No. 6,021,122, issued Feb. 1, 2000 entitled "METHOD AND APPARATUS FOR PERFORMING IDLE HANDOFF IN A MULTIPLE COMMUNICATION SYSTEM" and both are assigned to the assignee of the present invention.

BACKGROUND OF THE INVENTION

I. Field of the Invention

The present invention relates to communication systems. More particularly, the present invention relates to a novel and improved method and apparatus for performing idle handoff in a multiple access communication system. In addition, the present invention relates to an improved method for assigning a traffic channel in a multiple access communication system. The invention also relates to a method for reducing the number of required handoffs which occur while a mobile station is queued and waiting for a traffic channel in a multiple access communications system.

II. Description of the Related Art

Typically, communications systems prohibit handoffs while the mobile station is in a system access state. The system access state is the state in which communications are initiated either by the mobile station by means of transmissions over an access channel or by a base station by means of transmissions over a paging channel. In the exemplary embodiment, messages are sent in accordance with a code division multiple access (CDMA) communication format, which is disclosed in detail in U.S. Pat. No. 4,901,307 entitled "Spread Spectrum Multiple Access Communication System Using Satellite or Terrestrial Repeaters" and U.S. Pat. No. 5,103,459 entitled "System and Method for Generating Waveforms in a CDMA Cellular Telephone System," both of which are assigned to the assignee of the present invention and are incorporated by reference herein. The use of paging and access channels for call initiation is well known in the art and is detailed in TIA/EIA Interim Standard IS-95-A, entitled "Mobile Station-Base Station Compatibility Standard for Dual Mode Wideband Spread Spectrum Cellular System."

One of the characteristics of CDMA systems is that the same frequency is reused in every cell. Diversity combining is a method by which a receiver receiving signals carrying the same information, combines those signals which are propagated through different paths to provide an improved estimate of the transmitted signal. A receiver design for taking advantage of the diversity signals carrying the same information but traveling through different propagation paths or transmitted by different transmitters is described in detail in U.S. Pat. No. 5,109,390 entitled "Diversity Receiver in a CDMA Cellular Telephone System," assigned to the assignee of the present invention and incorporated by reference herein.

Soft handoff is a method by which a mobile station moving from one cell into another receives information from the base stations serving the two or more cells of the boundary area as long as the mobile station is located near the boundary. The signals which are sent by the base stations are combined in the receiver of the mobile station by the diversity combining method mentioned above. A method and system for providing soft handoff in a CDMA communication system, where a plurality of base stations are in communication with a mobile station at or near cell boundaries is disclosed in U.S. Pat. No. 5,101,501 entitled "Method and System for Providing a Soft Handoff in a CDMA Cellular Telephone System," and U.S. Pat. No. 5,267,261, entitled "Mobile Station Assisted Soft Handoff in a CDMA Cellular Communication System," both of which are assigned to the assignee of the present invention and incorporated by reference herein. Hard handoff is, in contrast to soft handoff, where a mobile station passing from one cell to another is dropped by the cell being exited prior to being picked up by the cell being entered.

The use of the same frequency in every cell and the use of soft handoff results in high CDMA system capacity. The reuse of the same frequency in the neighboring cell causes rather rapid changes in the forward link signal to noise ratio near cell boundaries. This is because the cell being received by the mobile station may fade and the neighboring cell may increase in strength (anti-fade).

Generally, when the mobile station is receiving two cells, the received traffic channel energy per spreading chip to total spectral noise density for the signal transmitted by cell 1 is given by equation (1) below:

$$\frac{E_c}{I_o}1 = \frac{\frac{E_c}{I_{or}}1}{\frac{I_{oc}}{\hat{I}_{or1}} + \frac{\hat{I}_{or2}}{\hat{I}_{or1}} + 1} \tag{1}$$

And the received traffic channel energy per spreading chip to total spectral noise density for the signal transmitted by cell 2 is given by equation (2) below:

$$\frac{E_c}{I_o}2 = \frac{\frac{E_c}{I_{or}}2}{\frac{I_{oc}}{\hat{I}_{or2}} + \frac{\hat{I}_{or1}}{\hat{I}_{or2}} + 1} \tag{2}$$

where in equations (1) and (2)

$I_{oc}$ is the total thermal noise, $$\frac{E_c}{I_{or}}1, \frac{E_c}{I_{or}}2$$

are the fraction of traffic channel power transmitted by cell 1 and cell 2 respectively, and $\hat{I}_{or1}, \hat{I}_{or2}$ are the fraction of traffic channel power received at the mobile station from cell 1 and cell 2 respectively.

Consider $I_{oc}$ to be small relative to $\hat{I}_{or1}$ and $\hat{I}_{or2}$. When cell 1 fades relative to cell 2 $\hat{I}_{or1}$ becomes small relative to $\hat{I}_{or2}$ (the ratio $$\frac{\hat{I}_{or2}}{\hat{I}_{or1}}$$

becomes large). Thus, $$\frac{E_c}{I_o}1$$

becomes small. If the mobile station is not in soft handoff, then this change in signal to noise ratio can cause problems. However, if the mobile station is in soft handoff with the neighboring cell, then the change in signal to noise ratio is not a problem because the mobile station is performing diversity combining of the forward traffic channels from both cells. While the first path given by $$\frac{E_c}{I_o}1$$

becomes small, the second path given by $$\frac{E_c}{I_o}2$$

becomes large. Thus, fading by one cell increases the signal to noise ratio from the other cell.

Paging is a method of sending information to a mobile station indicating the initiation of mobile terminated service or to receive an indication of new overhead information. A method for initiating a base station initiated call is described in detail in U.S. Pat. No. 5,392,287, entitled "APPARATUS AND METHOD FOR REDUCING POWER CONSUMPTION IN A MOBILE COMMUNICATIONS RECEIVER" and in copending U.S. patent application Ser. No. 08/206, 701, filed Mar. 7, 1994, which is a continuation of U.S. Pat. Ser. No. 5,392,287, both of which are assigned to the assignee of the present invention and are incorporated by reference herein. The present invention is equally applicable to mobile station initiated calls, the method for which is described in detail in copending U.S. patent application Ser. No. 08/219,867, filed Jan. 18, 1996 which is assigned to the assignee of the present invention and are incorporated by reference herein.

In a slotted paging system, a mobile station monitors the paging channel for a short predetermined interval of time and then does not monitor the paging channel again until the next predetermined time interval. In IS-95-A this method of periodically monitoring the paging channel is called slotted mode and the mobile station may monitor the paging channel for 80 ms. every 1.28 seconds. The period between monitoring intervals can be made longer as desired by the user. Before each predesignated time slot in which a mobile station may be paged, the mobile station wakes up (becomes active) and resynchronizes or improves its synchronization with the base station. The mobile station then monitors for pages or other messages in the slot. After some interval, the mobile station can become inactive and not monitor the paging channel until just before the next assigned slot.

Prior to the time when a mobile station is actively communicating traffic information with the mobile communication system and after the time when the mobile station has achieved timing synchronization with the communication system, the mobile station is in a state referred to as the idle state. In the idle state, the mobile station can receive messages, receive an incoming call, initiate a call, initiate registration, or initiate message transmission. When in the mobile station idle state, IS-95-A permits the mobile station to perform an idle handoff at any time other than the interval that the mobile station is required to be monitoring its assigned slot.

However, when the mobile station originates a call or receives a page, the mobile station enters the system access state to send an origination message or a page response message. While in the system access state, an IS-95-A mobile station does not operate in the slotted mode. This is called non-slotted operation. Specifically, the mobile station continually monitors the paging channel until directed by the base station to a different state or an error condition occurs permitting the mobile station to exit the system access state. The exemplary embodiment will be described in the context of the origination operation and origination message, but the concepts directly apply to the mobile terminated call process and page response message. After the mobile station sends the origination message and receives an acknowledgment, the mobile station waits for a channel assignment message, which indicates upon which channel traffic communications from the base station to the mobile station will be conducted.

Upon receipt of the channel assignment message, the mobile station tunes to the allocated traffic channel, receives information on the forward traffic channel, and begins to transmit on the reverse traffic channel. The forward traffic channel is the channel upon which information from the base station to the mobile station is sent and the reverse traffic channel is the traffic channel upon which information from the mobile station to the base station is sent.

The interval between the time that the mobile station sends the origination message and the time at which the mobile station receives the channel assignment message depends upon the implementation of the individual infrastructure vendor. It can range from less than one-half of a second to several seconds. Until the time that the mobile station receives the channel assignment message, the mobile station is in the system access state.

The paging channel typically does not support soft handoff. Thus the issues of fading previously described occur. These are typically counteracted by having the radiated power of the paging channel higher than the traffic channel. Since one paging channel can handle the call origination and termination of many traffic channels, the loss in capacity by this higher power is minimal. In order to support soft handoff on the paging channel, the system would essentially have to send the same information on the paging channel in all cells, thus dramatically reducing the overall capacity of the paging channel.

While in the idle state, the mobile station is permitted to perform handoffs. Typically, the mobile station performs a handoff whenever the received signal level from one cell gets sufficiently above another cell. This idle handoff is typically done before the mobile station begins monitoring the slot. However, there can be cases in which the mobile station is unable to choose the correct cell before the slot begins and the mobile station must continue to monitor the existing cell. While in the system access state, the mobile station is not permitted to perform idle handoffs.

However, when the mobile station is in the system access state there can be cases in which the change in signal to noise ratio, $$\frac{E_c}{I_o}1,$$

changes so fast that the message error rate becomes so high that mobile station cannot correctly receive the signaling messages sent on the paging channel. As a result, the mobile station may not receive the channel assignment message. This means that the call origination was not successful. IS-95-A permits the mobile station to exit the system access state and return to the mobile station idle state, if it has not received any paging channel messages for one second. This means that the mobile station does not receive the channel assignment message and the call origination was unsuccessful.

A similar problem exists when the mobile station is first assigned to the traffic channel. IS-95-A permits only a single base station to be assigned to the mobile station. If another cell is strong or becomes stronger, the mobile station may not be able to receive the forward traffic channel successfully. As a result, the call may drop. The problem is that the mobile station is assigned to a traffic channel with a single active set member and is not in soft handoff.

Under IS-95-A, in order for the mobile station to enter into soft handoff, the following steps must occur. First, the mobile station detects that the pilot of another base station is above a predetermined energy threshold value. Second, the mobile station sends a pilot strength measurement message. Third, the infrastructure sets up the handoff, and the infrastructure sends the handoff direction message to the mobile station. Depending upon the circumstances and the implementation, this may take from a few hundred milliseconds to considerably more than one second.

Thus, although soft handoff is generally supported in IS-95-A systems. However, soft handoff is not supported when the mobile station is in the system access state. Thus, there is a need for a system which permits soft handoff while the mobile station is in the system access state to provide increased reliability in the system access process and other benefits.

SUMMARY OF THE INVENTION

The present invention describes several modifications which can improve operation on the paging and access channels. The first feature of the present invention is that it permits handoffs while the mobile station is in the system access state. This permits the mobile station to receive a base station whose signal-to-noise ratio is high so that the message error rate is low. This avoids having dropped call setups due to the inability to receive the paging channel. By permitting handoff, the base station needs to send the channel assignment message over the paging channel via a plurality of base stations.

A second feature of the present invention is that it permits the infrastructure to know which base stations should send the channel assignment message to the mobile station. In addition, this assures the mobile station will be able to handoff to a different base station and have a traffic channel allocated to it on the new base station without delay.

A third feature of the present invention is that it permits the infrastructure to know which base stations should be in the mobile station's active set before the mobile station is assigned to the traffic channel. The active set is a set of base stations which are providing the strongest signals to the mobile station at a given time. This permits the infrastructure to determine, before the mobile station is assigned to the traffic channel, whether there are sufficient resources to place the mobile station into soft handoff. This is useful because a mobile station near the cell boundary may immediately request to be placed into soft handoff after it is assigned to the traffic channel. Furthermore, this minimizes call drops due to the rapid changes in signal-to-noise ratio mentioned previously.

In addition, coupled with the third feature of the present invention is the inclusion of multiple active set members in the channel assignment message, permitting the mobile station to be assigned to a traffic channel in a soft handoff state.

Finally the features presented above provide special utility in the priority access and channel allocation (PACA) operation which provides for users to gain access to limited communication resources in accordance with designated user priorities.

While the invention is described in terms of a CDMA system, the invention is applicable to any cellular or satellite communications system.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
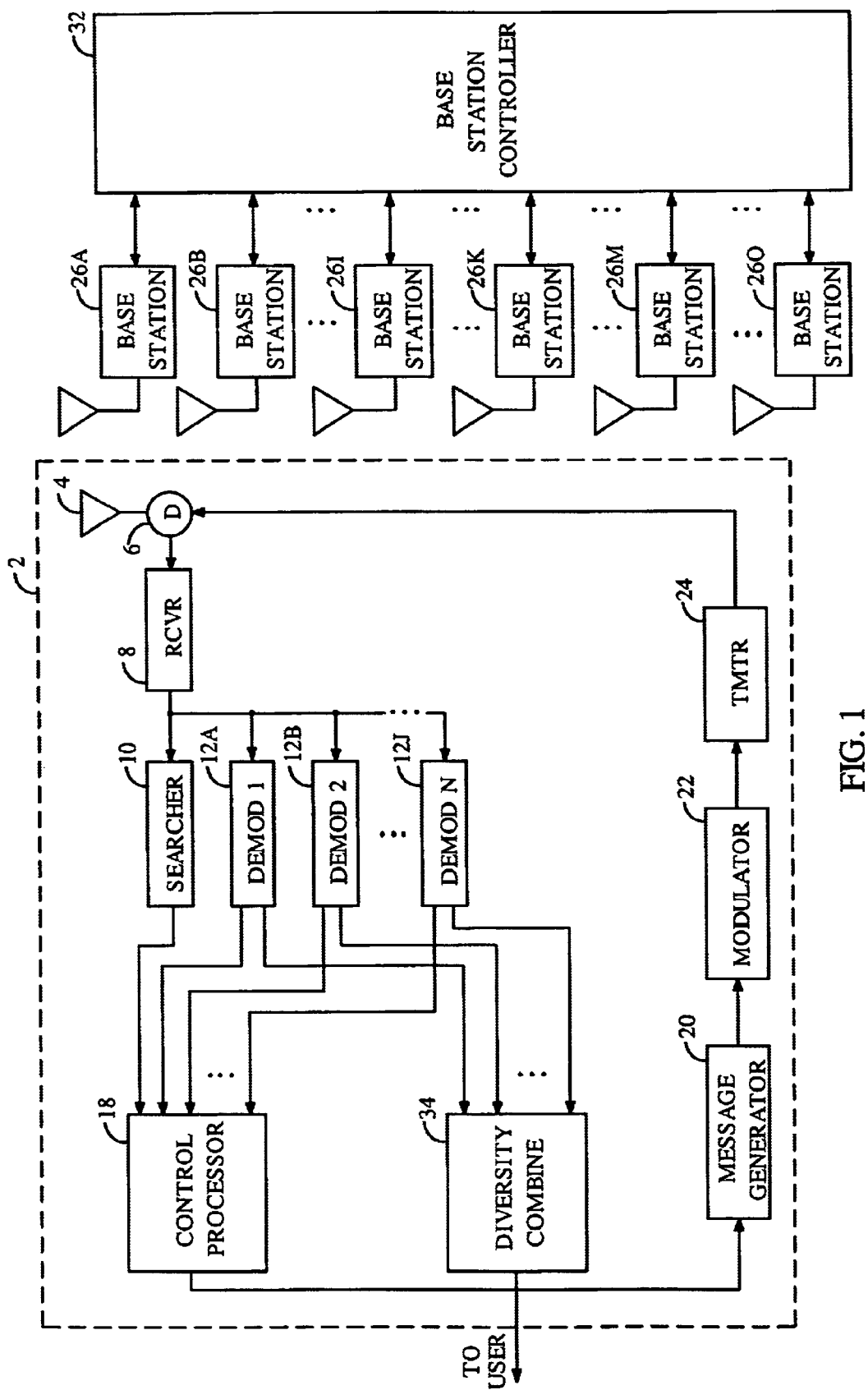
FIG. 1 is a block diagram of a mobile station communicating with a base station of a group of base stations.

Referring to FIG. 1, upon power-up, mobile station 2 enters the system determination substate. A system determination processor (not shown) selects a system upon which to perform an acquisition attempt and provides the necessary frequency information to receiver (RCVR) 8. Although not separately shown, the system determination processor could be implemented within control processor 18. Control processor 18 can be implemented in a microprocessor or microcontroller operating under program control stored in memory.

In the exemplary embodiment, after having selected a system for system determination, mobile station 2 moves into the pilot acquisition substate in which it attempts to demodulate a pilot signal based on the acquisition parameters retrieved in the system determination substate.

In the exemplary embodiment, mobile station 2 attempts to acquire a CDMA pilot signal in accordance with the acquisition parameters. Signals (if present) are received at antenna 4 and passed through duplexer 6 to receiver 8. Receiver 8 downconverts, amplifies the received signal, converts the analog signal to a digital representation and passes the signal to searcher 10. Searcher attempts to acquire a pilot signal by testing PN offsets. A PN offset is tested by demodulating the signal in accordance with the PN offset hypothesis and measuring the signal energy of the demodulated signal. Design and implementation of searcher hardware for CDMA acquisition is know in the art and is described in detail in aforementioned U.S. Pat. No. 5,109,390.

When searcher 10 detects a pilot signal with energy above a predetermined threshold value, mobile station 2 enters the Sync channel acquisition substate and attempts acquisition of the Sync channel. Typically, the Sync channel as broadcast by the base stations includes basic system information such as the system identification (SID) and the network identification (NID), but most importantly provides timing information to mobile station 2. Mobile station 2 adjusts its timing in accordance with the Sync channel information and then enters the mobile station idle state.

Upon successful acquisition of the Sync channel, mobile station 2 begins to monitor the paging channel in accordance with a predetermined paging format. Mobile station 2 demodulates a signal based on a predetermined Walsh sequence that is reserved for paging channel transmissions. For example say that the pilot signal that was acquired was transmitted by base station 26a, then mobile station 2 monitors the paging channel in accordance with timing information provided by the Sync channel and using a predetermined Walsh sequence. Base station 26a intermittently transmits overhead information on the paging channel.

In the exemplary embodiment, the overhead information includes a list known as the neighbor list. In IS-95-A, this list is provided to the mobile station 2 by base stations 26a–26n in the Neighbor List Message. This list is referred to herein as NGHBR_LIST_BASE. NGHBR_LIST_BASE is a list of base stations in the vicinity of base station 26a which may provide strong signals to mobile station 2 and thus are candidates for idle handoff. In the exemplary embodiment base stations 26a–26k in FIG. 1 correspond to cells 36a–36k in FIG. 2, respectively. Thus, base station 26a provides coverage to cell 36a.

Referring to FIG. 1, in the exemplary embodiment base stations 26b–26k are in NGHBR_LIST_BASE transmitted to mobile station 2. It should be noted that the present invention is equally applicable to the case where some of the base stations in the neighbor list are not controlled by the same the base station controller (BSC) 32. Base station controller 32 is responsible for providing information between the base stations 26a–26o, for selectively providing information from a main telephone switching office (MTSO) (not shown) to base stations 26a–26o and for providing the base stations 26a–26o with internally generated messages.

If the pilot signal acquired was transmitted by base station 26a, after receiving the overhead information, mobile station 2 may register with base station 26a by transmitting its mobile identification number (MIN) to base station 26a. Mobile station 2 then enters the idle state and monitors its allocated paging channel in the slotted paging mode after successful registration with base station 26a. If registration is not performed, the mobile station also enters the idle state and monitors, in the slotted paging mode, its allocated paging channel which is transmitted by base station 26a.

In slotted paging mode, base station 26a transmits any paging or signaling information directed to mobile station 2 at predetermined time intervals called time slots. In the exemplary embodiment, the time slots and paging channel are determined in accordance with a hashing function of the mobile identification number (MIN), which upon registration is known to base station 26a and mobile station 2.

In the present invention, base station 26a transmits to mobile station 2 a list of base stations to which mobile station 2 is permitted to perform idle handoff while in the system access state. This list is referred to herein as LIST_BASE. Base stations in LIST_BASE are typically a subset of the base stations in NGHBR_LIST_BASE and would typically be using the same base station controller (BSC). So for example in FIG. 1 NGHBR_LIST_BASE may consist of all the base stations 26b–26k, but the LIST_BASE may consist of the subset of base stations 26b, 26c (not shown), 26g (not shown), and 26h (not shown).

The following description is in terms of a call origination and the discussion centers around the origination message. The same procedures apply to call termination with the page response message substituted for the origination message.

When mobile station 2 originates a call, message generator 20 generates an origination message and transmits that message on the access channel. Message generator 20 can be implemented in a microprocessor programmed to carry out the functions described. Although illustrated as a separate element message generator 20 could be implemented within control processor 18. That message is received and demodulated by base station 26a which the mobile station is currently monitoring. In response to receiving the origination message, each of the base stations in LIST_BASE 26a–26i transmits a channel assignment message indicating a traffic channel upon which communications will be conducted. It should be noted that typically the Walsh channel used for communications with a first base station in LIST_BASE will not be the same Walsh channel used for communications with a second base station in LIST_BASE. Because a plurality of base stations are sending the channel assignment message, the mobile station 2 is free to perform an idle handoff while in the System Access state and after sending the origination message to any base station which is in LIST_BASE and still be able to receive the channel assignment message.

In an alternative embodiment, mobile station 2 sends the origination message to base station 26a and then waits for an acknowledgment of the origination message. Until the mobile station receives the acknowledgment, the mobile station is not permitted to perform a handoff. However, after the mobile station receives the acknowledgment, the mobile station is free to perform an idle handoff to any base station in LIST_BASE.

In another alternative embodiment, mobile station 2 sends the origination message using the procedures described in IS-95-A as described in detail in copending U.S. patent application Ser. No. 08/412,648, filed May 17, 1995, now U.S. Pat. No. 5,673,259, issued Sep. 30, 1997 to Quick Jr., entitled "RANDOM ACCESS COMMUNICATIONS CHANNEL FOR DATA SERVICES," assigned to assignee of the present invention and incorporated by reference herein. If an acknowledgment is not received from base station 26a within a predetermined timeout period, the mobile station increases its transmit power and attempts to send the message again. If mobile station 2 is unable to receive an acknowledgment from base station 26a after a certain number of attempts and another base station, base station for example 26b, is stronger, mobile station 2 is permitted to perform an idle handoff to base station 26b and restart the transmission of the origination message.

In one embodiment, each of base stations in LIST_BASE transmits a channel assignment message only indicating a traffic channel for communication with that particular base station. In an alternative embodiment, each of base stations 26a–26i in LIST_BASE transmits an identical Channel Assignment Message that indicates not only the traffic channel to be used for communications with that particular base station but also indicates the traffic channel to be used for communications with all base stations in LIST_BASE. This would require the base stations 26a–26i in LIST_BASE communicate the available traffic channels through base station controller 32. By providing channel assignment messages from a plurality of base stations, the success rate of the channel assignment process is greatly enhanced.

The above process permits the infrastructure to set up soft handoff and include more than one member of the Active Set in the Channel Assignment Message. Instead of first communicating with one base station and then moving into soft handoff, it is thus possible for mobile station 2 to come up immediately in a soft handoff state and immediately receive traffic communication from two or more base stations. This speeds up the process of getting mobile station 2 into soft handoff, which improves performance of the system and minimizes call drops due to a low forward traffic channel signal to noise ratio.

In one embodiment of this process, the base station sets up soft handoff with all base stations in LIST_BASE. In an alternative embodiment of this process, the base station sets up soft handoff with a subset of base stations in LIST_BASE and sends the information in the channel assignment message necessary for mobile station 2 to enter into soft handoff. This information includes the identities of this subset of base stations. In IS-95-A, the pilot PN offset identifies the base station.

The paging messages sent by base stations 26a–26i are received at antenna 4 of mobile station 2. The received message is then provided through duplexer 6 to receiver 8 where the received signal is down converted and amplified. The down converted messages are provided to demodulators 12a–12j which demodulate the received messages. Control processor 18 in accordance with information from searcher 10, selects the paging channel or channels that mobile station 2 will demodulate the incoming paging channel data. In one embodiment, demodulators 12a–12j monitor only one base station.

Searcher 10 in conjunction with control processor 18 determines that another base station is better. Then control processor 18 has the demodulators begin to demodulate the received signal from the other base station. Because mobile station 2 will receive an assignment message from more than one base station, mobile station 2 is free to perform an idle handoff while in the system access state. In another embodiment, mobile station 2 monitors all base stations in LIST_BASE and demodulates signals identified in LIST_BASE.

In a preferred embodiment, LIST_BASE is not provided separately from the Neighbor List Message, but rather an indication is provided indicating which members of the neighbor list (NGHBR_LIST_BASE) are members of LIST_BASE along with the Neighbor List Message. In the exemplary embodiment, one of the reserved values in the overhead message is used to indicate which of the systems specified in the Neighbor List Message are in LIST_BASE. In the exemplary embodiment of an IS-95-A base station, the reserved values in the overhead message used to specify the members of LIST_BASE are NGHBR_CONFIG values in the Neighbor List Message.

In the exemplary embodiment, the IS-95-A Neighbor List Message includes the pilot PN offsets for base stations in the NGHBR_LIST_BASE and an indication of which base stations in the Neighbor List Message are in LIST_BASE. The pilot PN sequence for the current base station is transmitted to provide a reference for mobile station 2 with which it can use to identify the other base station PN offsets.

As described above, all base stations in LIST_BASE would be required to send channel assignment messages to mobile station 2. While this would permit mobile station 2 to handoff and thus increase the success rate of the channel assignment process, it requires additional Paging Channel capacity for all call setups.

A modification of this procedure that would reduce the impact to the paging channel capacity is to have mobile station 2 send a list of pilots which are above a predetermined power threshold. This list is referred to herein as LIST_MOBILE. In one embodiment, searcher 10 demodulates pilot signals with a preference to the PN offsets of the base stations in the LIST_BASE followed by the PN offsets of base stations in NGHBR_LIST_BASE and then in accordance with the remaining PN offsets. A method for providing an optimized search prioritization is described in the aforementioned U.S. Pat. No. 5,267,261.

In the exemplary embodiment, searcher 10 demodulates the received signals in accordance with a pilot PN offset and measures the energy of the demodulated pilot. The energy values are provided to control processor 18. Control processor 18 compares the energy of the demodulated signal with a threshold value and compiles a list of PN offsets which are above that threshold. This list is referred to as LIST_MOBILE. Once LIST_MOBILE has been compiled it is transmitted on the access channel and is received by base station 26a which mobile station 2 is monitoring. In the exemplary embodiment, LIST_MOBILE is included in the origination message.

In another embodiment, LIST_MOBILE is received by more than one of base stations 26a–26o. LIST_MOBILE is provided to base station controller 32. In the preferred embodiment, the threshold used by mobile station 2 to determine whether to include a base station in LIST_MOBILE is sent as part of the overhead messages by base stations 26a–26o. In the preferred embodiment, this threshold could be the T_ADD value sent in the IS-95-A System Parameter Message. This T_ADD value is currently used by the IS-95-A mobile stations to determine whether to send the IS-95-A Pilot Strength Measurement Message on the traffic channel to the base station indicating that the mobile station has detected a pilot exceeding T ADD.

Figure 3:
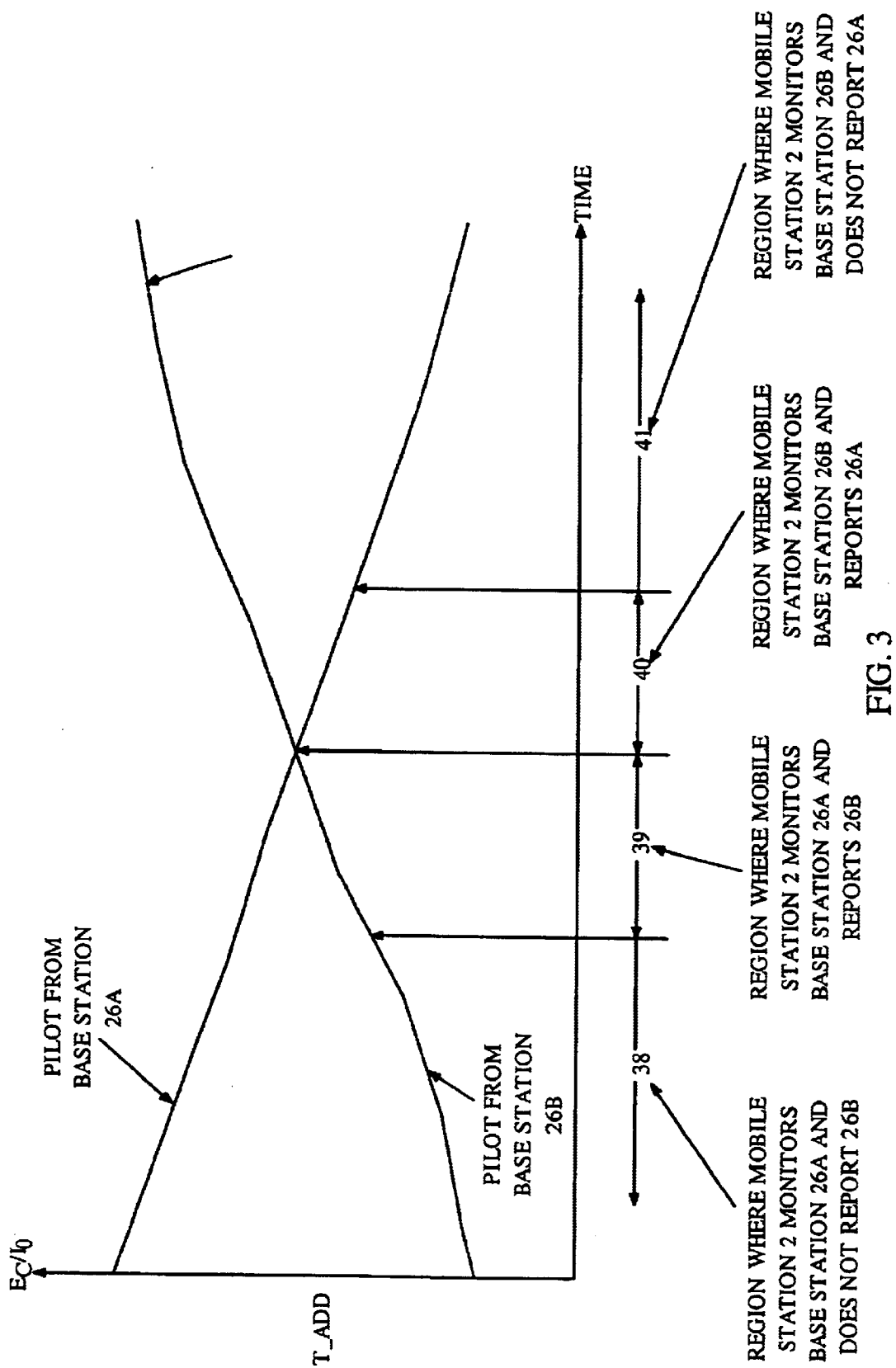
FIG. 3 shows the pilot $E_c/I_o$ for a mobile station moving between two base stations.

FIG. 3. illustrates the $E_c/I_0$ for the IS-95-A pilot channel broadcast by base stations 26a and 26b as mobile station 2 moves away from base station 26a towards base station 26b. When mobile station 2 is fully within the coverage of base station 26a as indicated by region 38, the pilot channel of base station 26b is below the T_ADD level. Similarly, when mobile station 2 is fully within the coverage of base station 26b as indicated by region 41, the pilot channel of base station 26a is below the T_ADD level. When mobile station 2 is in region 38, it does not report, in the origination message, base station 26b. Similarly, when mobile station 2 is in region 41, it does not report, in the origination message, base station 26a.

When mobile station 2 is in region 39, the pilot $E_c/I_o$ for base station 26b is above T_ADD and the mobile station reports 26b in the origination message. Similarly, when mobile station 2 is in region 40, the pilot $E_c/I_0$ for base station 26a is above T_ADD and the mobile station reports 26a in the origination message. The preferred embodiment uses $E_c/I_0$ as given in IS-95-A for these measures; however, alternative measures of signal strength or signal-to-noise ratio which are well known in the art are equally applicable.

In the preferred embodiment, mobile station 2 would be permitted to perform an idle handoff only to those base stations in both LIST_MOBILE and LIST_BASE. Call the set of base stations in both lists LIST_BOTH. This has two advantages. First, the infrastructure need only send the Channel Assignment Message in those base stations identified by the mobile station as possible candidates for an idle handoff and which the mobile station is permitted to handoff. This is the set of base stations is given in LIST_BOTH. This will significantly reduce the additional messaging that is required. Second, LIST_MOBILE provides a list of pilots above T_ADD to base station controller 32, which permits the infrastructure to identify which base stations should be a member of the mobile station's Active Set. Thus, if the base station controller 32 desires to set up soft handoff when the mobile station is assigned to a traffic channel, it only needs to set up soft handoff with those base stations in LIST_MOBILE.

In an alternative embodiment, mobile station 2 sends to the base station in its origination message those base stations in LIST_BOTH. This reduces the amount of information which needs to be sent from mobile station 2.

Furthermore, it permits the infrastructure to set up soft handoff and include more than one member of the Active Set in the Channel Assignment Message. The Channel Assignment Message would include the pilot PN offsets of base stations which are in the Active Set. It is possible for the mobile station 2 to come up immediately in a soft handoff state and immediately receive traffic communication from two or more base stations, instead of first communicating with one base station and then moving into soft handoff which may not be possible due to capacity or other limitations.

Figure 2:
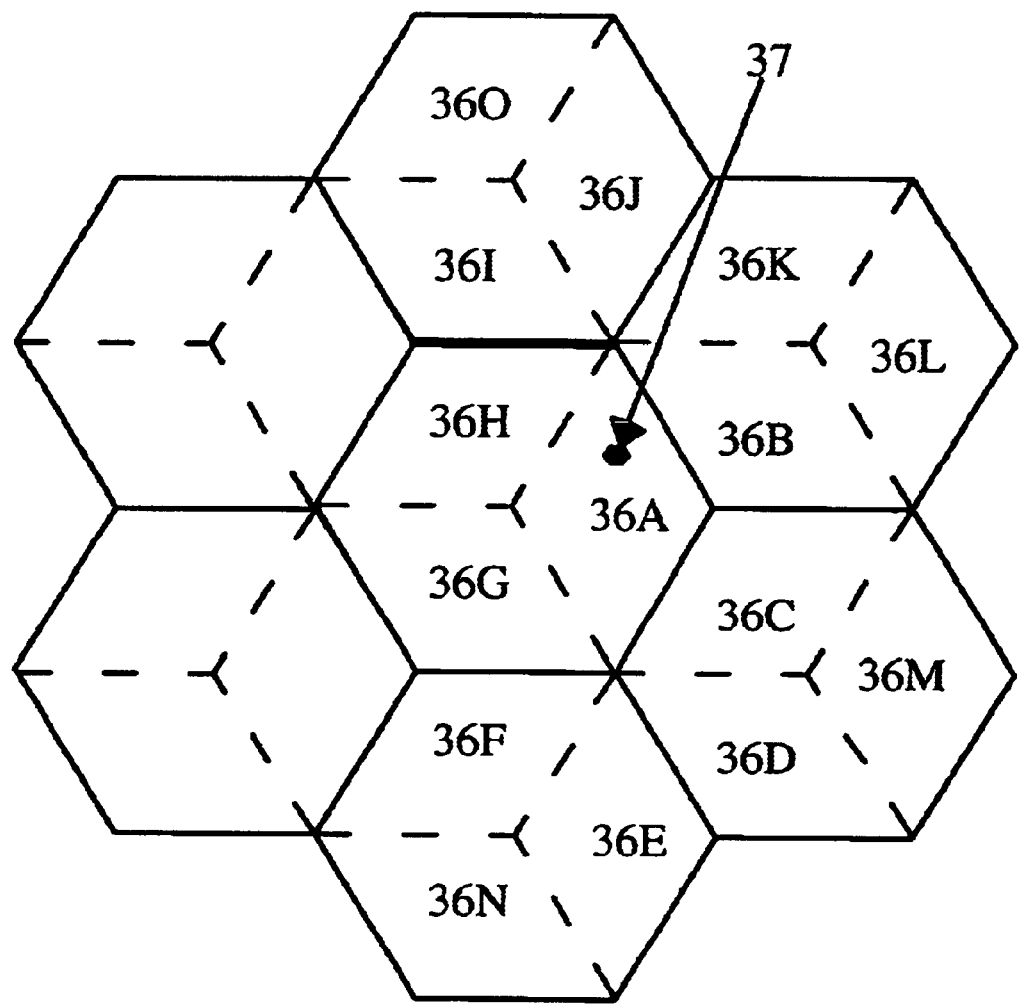
FIG. 2 shows a layout of cells corresponding to base stations.

For example, if mobile station 2 is in cell 36a near the boundary with cell 36b at location 37 as shown in FIG. 2, then LIST_MOBILE will identify the pilot PN offsets of base station 26b. The channel assignment message that will transmitted by both base station 26a and 26b will identify a traffic channel for use by mobile station 2 for dedicated communications between base stations 26a and 26b and mobile station 2. At least one of demodulators 12a–12j will be tuned to receive traffic channel information from base stations 26a and another one of demodulators 12a–12j will be tuned to receive traffic channel information from base stations 26b. A plurality of demodulators 12a–12j will begin demodulating the traffic channel signals transmitted by base stations 26a and 26b. The demodulated signals will be provided to diversity combiner 34 which combines the received signals to provide an improved estimate of the transmitted data.

There are several other items which are important to the present invention. The first is that mobile station 2 may not be allowed to perform the idle handoff until it receives the acknowledgment to a transmitted message or the timeout for receiving the acknowledgment has expired. This is to permit mobile station 2 to receive the acknowledgment to its access channel probes. It also permits the base station 26a to which the mobile station is sending its access channel probes to generate the acknowledgment rather than the acknowledgment being generated by base station controller 32. This has the advantage of reducing delay, thus making the call setup process faster. Furthermore, if mobile station 2 is in the System Access State and does perform an idle handoff after the acknowledgment timeout has expired, mobile station 2 must restart the Access Channel probe transmission procedures. This would be the same as if mobile station 2 transmitted a new origination message.

In an alternative embodiment, mobile station 2 may perform the idle handoff to base stations in LIST_BASE before receiving the acknowledgment. However, this means that all base stations in LIST_BASE would need to send the acknowledgment and thus base station controller 32 would need to be involved in generating the acknowledgments. In an modification of this alternative embodiment, the mobile station 2 may perform the idle handoff to base stations in LIST_MOBILE before receiving the acknowledgment. Similarly, this means that all base stations in LIST_MOBILE would need to send the acknowledgment and thus base station controller 32 would need to be involved in generating the acknowledgments.

In a preferred embodiment, the present invention provides for the contingency that the channel assignment message was transmitted by base station 26a but not received by mobile station 2. Base station 26a may have received the Origination Message, from mobile station 2, but mobile station 2 may not have received the channel assignment message acknowledging the receipt of the Origination Message from base station 26a. Even absent receipt of the acknowledgment message, mobile station 2 may perform the idle handoff to, for example, base station 26b.

Base station 26b may be sending the Channel Assignment Message to mobile station 2, while the mobile station 2 is retransmitting the Origination Message. In the exemplary embodiment when an acknowledgment message is sent, an indication of which message is being acknowledged accompanies it. Mobile station 2 ignores the Channel Assignment Message unless the indicator corresponds to the most recently sent Origination Message. The present invention presents several ways to correct this problem. An obvious one is to have the base station 26b use the same acknowledgment indicator as was in the Origination Message received by base station 26a. This can be done by passing the acknowledgment indicator values from base station 26a to base station 26b through base station controller 32. In an alternative embodiment, mobile station 2 can stop transmitting an access probe if it receives the Channel Assignment Message and tune to the channel specified by the Channel Assignment Message.

In an improved embodiment, the Paging Channel configuration of all base stations to which mobile station 2 is allowed to handoff (base stations in LIST_BASE) are the same. Base stations not supporting these capabilities would not be included in LIST_BASE.

The above scheme can also be used to support Priority Access and Channel Allocation (PACA). The PACA feature is well known in the art and is described in detail in "TIA/EIA/IS-53-A Cellular Features Description." When PACA is invoked, mobile station 2 is given priority over other mobile stations in obtaining a Traffic Channel when a Traffic Channel is not available. Specifically, mobile station 2 sends an Origination Message containing the PACA feature code and the dialed number. If a Traffic Channel is immediately available, mobile station 2 is assigned to the Traffic Channel. If a Traffic Channel is not immediately available and mobile station 2 is authorized to use PACA, the base station monitoring mobile station 2, say base station 26a, places mobile station 2's request into a PACA queue. Alternatively, this PACA queue can be managed by base station controller 32. The position in the queue depends upon the priority of the PACA request and the age of the request. When a Traffic Channel becomes available, the request at the head of the PACA queue is assigned to the Traffic Channel.

When the mobile station 2's request is in a PACA queue, mobile station 2 may be sent periodic messages informing the user of mobile station 2 of the queue status. One issue with PACA is that the infrastructure needs to know the cell which mobile station 2 is currently using in order to determine whether the channel is free. With most systems, this implies that mobile station 2 must register or resend the Origination Message every time mobile station 2 performs an idle handoff. Due to the abruptness of transitions between CDMA base stations, mobile station 2 may register or resend the Origination Message several times while crossing the boundary between base stations. A second consideration with CDMA is that mobile station 2 may need to be placed into soft handoff soon after it is assigned to a Traffic Channel. Unless resources are available in multiple base stations to support the call, the assignment may not be successful.

With the modified Origination Message described above, mobile station 2 indicates other base stations which should be in the mobile station's Active Set, the set of base stations from which mobile station 2 has detected strong pilot signals. In one embodiment, mobile station 2 sends LIST_MOBILE and the base station determines LIST_BOTH. In another embodiment, mobile station 2 sends LIST_BOTH. This permits the infrastructure to determine whether resources are free in all base stations needed for the PACA call. In order to reduce the rate of sending the Origination Message, the base stations in LIST_BOTH are those which the mobile station can move without having to resend the Origination Message. When this feature is invoked, the infrastructure needs to send the queue status information in all base stations in LIST_BOTH. If mobile station 2 moves out of the coverage of the base stations in LIST_BOTH, mobile station 2 resends the Origination Message.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A method for receiving channel assignment messages at a mobile station in a code division multiple access (CDMA) system, the method comprising the steps of:

measuring strength of signals from a plurality of base stations;

determining a subset of said plurality of base stations based on the strengths of the signals from said plurality of base stations relative to a predetermined threshold;

transmitting an origination message from said mobile station in an access state, said origination message indicating the base stations in said subset; and receiving a channel assignment message from each of the base stations of said subset, the channel assignment message indicating a traffic channel.

2. The method of claim 1 wherein said origination message indicates a mobile station identifier.

3. The method of claim 2 wherein the base stations in said subset are identified by a plurality of pilot pseudo-noise (PN) offsets, respectively.

4. The method of claim 1 further comprising the steps of:

demodulating a traffic channel frame from each of said subset of base stations; and combining said demodulated traffic channel frame to provide an improved estimate of said traffic channel frame.

5. The method as claimed in claim 1 further comprising:

receiving an acknowledgement message from said subset of said plurality of base stations.

6. The method as claimed in claim 1 wherein the step of receiving a channel assignment message comprises:

receiving a paging message from said subset of said plurality of base stations, the paging message indicating traffic channel of one of the base stations transmitting said message.

7. The method as claimed in claim 1 wherein the step of receiving a channel assignment message comprises:

receiving a paging message from said subset of said plurality of base stations, the paging message indicating traffic channel of each base station of said subset of said plurality of base stations.

8. A code division multiple access (CDMA) mobile station apparatus, comprising:

a receiver configured to:

measure strengths of signals from a plurality of base stations; and determine a subset of said plurality of base stations based on the strengths of the signals from said plurality of base stations relative to a predetermined threshold; and a transmitter coupled to said receiver configured to transmit an origination message in an access state, said origination message indicating the base stations in said subset, wherein said receiver is configured to receive a channel assignment message from each of the base stations of said subset, the channel assignment message indicating a traffic channel.

9. The apparatus of claim 8 wherein said origination message indicates a mobile station identifier.

10. The apparatus of claim 9 wherein the base stations in said subset are identified by a plurality of pilot pseudo-noise (PN) offsets, respectively.

11. The apparatus of claim 8 further comprising:

a demodulator configured to demodulate a traffic channel frame from each of said subset of base stations; and a combiner to combine said demodulated traffic channel frame to provide an improved estimate of said traffic channel frame.

12. The apparatus as claimed in claim 8 wherein said receiver is further configured to receive an acknowledgement message from said subset of said plurality of base stations.

13. The apparatus as claimed in claim 8 wherein said receiver is further configured to:

receive a paging message from said subset of said plurality of base stations, the paging message indicating traffic channel of one of the base stations transmitting said message.

14. The apparatus as claimed in claim 8 wherein said receiver is further configured to:

receive a paging message from said subset of said plurality of base stations, the paging message indicating traffic channel of each base station of said subset of said plurality of base stations.

15. A method for receiving channel assignment messages at a mobile station in a code division multiple access (ODMA) system, the method comprising the steps of:

measuring strengths of signals from a plurality of base stations;

determining a subset of said plurality of base stations based on the strengths of the signals from said plurality of base stations relative to a predetermined threshold;

transmitting a page response message from said mobile station in an access state, said page response message indicating the base stations in said subset; and receiving a paging message from each of the base stations of said subset, the paging message indicating a traffic channel.

16. The method of claim 15 wherein said page response message indicates a mobile station identifier.

17. The method of claim 15 wherein the base stations in said subset are identified by a plurality of pilot pseudo-noise (PN) offsets, respectively.

18. The method of claim 15 further comprising the steps of:

demodulating a traffic channel frame from each of said subset of base stations; and combining said demodulated traffic channel frame to provide an improved estimate of said traffic channel frame.

19. The method as claimed in claim 15 further comprising:

receiving an acknowledgement message from said subset of said plurality of base stations.

20. The method as claimed in claim 15 wherein the step of receiving a paging message comprises:

receiving a paging message from said subset of said plurality of base stations the paging message indicating traffic channel of one of the base stations transmitting said message.

21. The method as claimed in claim 15 wherein the step of receiving a paging message comprises:

receiving a paging message from said subset of said plurality of base stations, the paging message indicating traffic channel of each base station of said subset of said plurality of base stations.

22. A code division multiple access (CDMA) mobile station apparatus, comprising:

a receiver configured to:
measure strengths of signals from a plurality of base stations; and
determining a subset of said plurality of base stations based on the strengths of the signals from said plurality of base stations relative to a predetermined threshold; and a transmitter coupled to said receiver configured to transmit a page response message in an access state, said page response message indicating the base stations in said subset, wherein said receiver is configured to receive a paging message from each of the base stations of said subset, the paging message indicating a traffic channel.

23. The apparatus of claim 22 wherein said page response message indicates a mobile station identifier.

24. The apparatus of claim 23 wherein the base stations in said subset are identified by a plurality of pilot pseudo-noise (PN) offsets, respectively.

25. The apparatus of claim 22 further comprising:

a demodulator configured to demodulate a traffic channel frame from each of said subset of base stations; and a combiner to combine said demodulated traffic channel frame to provide an improved estimate of said traffic channel frame.

26. The apparatus as claimed in claim 22 wherein the receiver is further configured to receive an acknowledgement message from said subset of said plurality of base stations.

27. The apparatus as claimed in claim 22 wherein said receiver is further configured to:

receive a paging message from said subset of said plurality of base stations, the paging message indicating traffic channel of one of the base stations transmitting said message.

28. The apparatus as claimed in claim 22 wherein said receiver is further configured to:

receive a paging message from said subset of said plurality of base stations, the paging message indicating traffic channel of each base station of said subset of said plurality of base stations.

* * * * *